July 23, 1940.    E. E. MOYER    2,209,232
ELECTRIC REGULATING SYSTEM
Filed Sept. 30, 1938
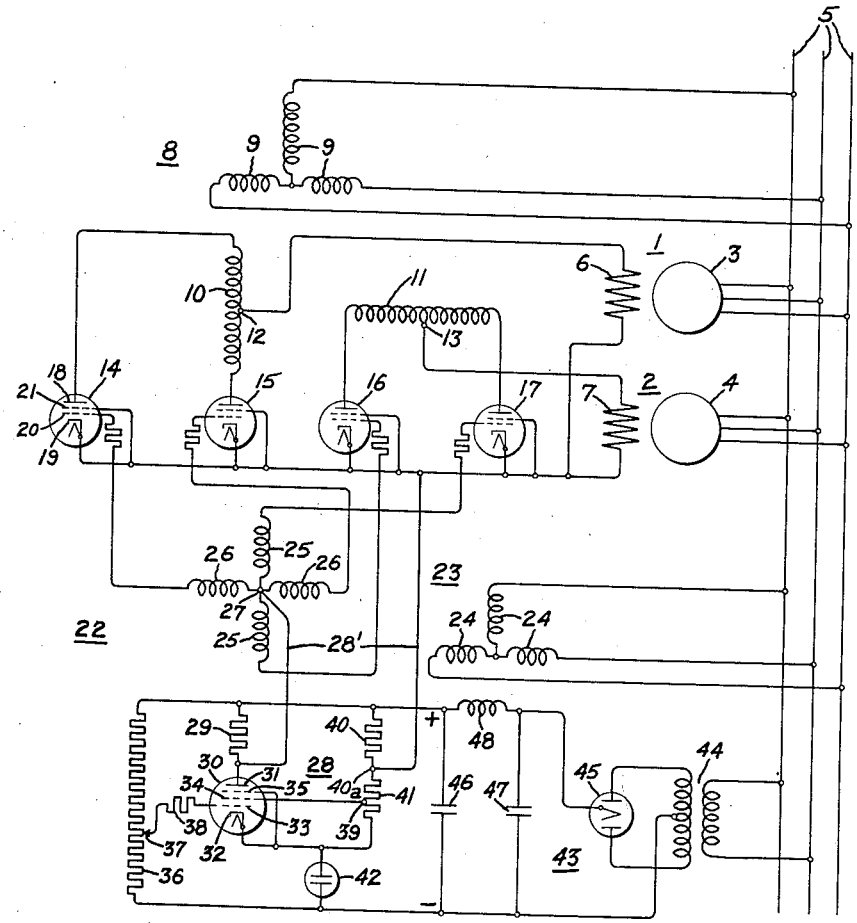
Inventor:
Elmo E. Moyer,
by Harry E. Dunham
His Attorney.

Patented July 23, 1940

2,209,232

UNITED STATES PATENT OFFICE 2,209,232

ELECTRIC REGULATING SYSTEM

Elmo E. Moyer, Scotia, N. Y., assignor to General Electric Company, a corporation of New York Application September 30, 1938, Serial No. 232,599

7 Claims. (Cl. 171—119)

My invention relates to electric valve circuits and more particularly to electric valve regulating systems for dynamo electric machines.

Electric valves are being applied to greater extents to dynamo electric machine control systems. For example, electric valves of the type employing ionizable mediums, such as gases or vapors, are being applied to control or excitation systems for energizing the field windings of dynamo electric machines. In some applications it is important to provide systems in which the excitation circuits are energized from a plurality of individual electric valve circuits rather than from a single electric valve rectifier. Furthermore, in other applications it is important to operate dynamo electric machines, such as alternating current generators and synchronous condensers in parallel, and it is important to employ electric valve apparatus for energizing the field windings of these machines in order to utilize the rapidity of response available in electric valve equipment. In accordance with the teachings of my invention described hereinafter I provide new and improved electric valve control and regulating systems for energizing field windings of dynamo electric machines, which may be operated in parallel relation with respect to an associated polyphase alternating current circuit; and which impose only balanced and distributed loads on the circuit.

It is an object of my invention to provide a new and improved electric valve circuit for dynamo-electric machines.

It is another object of my invention to provide a new and improved electric valve translating system for energizing the field windings of alternating current generators or field windings of synchronous condensers which operate in parallel.

It is a further object of my invention to provide a new and improved voltage regulating system for dynamo electric machines which operate in parallel relation.

In accordance with a feature of the embodiment of my invention diagrammatically illustrated I provide a new and improved electric valve translating system for energizing the field windings of two or more alternating current dynamo electric machines which are connected to an associated three-phase alternating current circuit. I provide a Scott-connected transformer which is connected to the three-phase alternating current circuit and which is provided with a pair of independent secondary windings which provide voltages in quadrature relationship with each other. Independent electric valve means are connected between each of the secondary windings and a different one of the field windings for transmitting unidirectional current thereto. I also provide a single voltage regulating or determining circuit which is connected to be responsive to the voltage of the alternating current circuit or to be responsive to the armature voltage of the parallel-connected alternating current machines. The voltage control circuit includes a transformer which is arranged in a Scott-connection, or a T-connection, for impressing on control members of the electric valves voltages which lag the respective anode-cathode voltages by substantially 90 electrical degrees. There is also provided an improved circuit for superimposing on the quadrature alternating voltages a unidirectional voltage which varies in magnitude in accordance with an electrical condition such as the voltage of the alternating current machines.

For a better understanding of my invention, reference may be had to the following description taken in connection with the accompanying drawing and its scope will be pointed out in the appended claims. The single figure of the accompanying drawing diagrammatically illustrates an embodiment of my invention as applied to an electric valve translating and regulating system for energizing the field windings of a pair of parallel connected alternating current generators or synchronous condensers.

Referring now to the single figure of the accompanying drawing, I have chosen to show my invention as applied to an electric valve translating system associated with a plurality of machines, such as a pair of alternating current dynamo electric machines 1 and 2 which may be alternating current generators or synchronous condensers. The machines 1 and 2 are preferably designed to be electrically similar, that is, the machines 1 and 2 are designed to have substantially identical electrical constants and characteristics. Machines 1 and 2 are provided with armature windings 3 and 4, respectively, which are connected to an associated polyphase circuit such as a three-phase alternating current circuit 5. Machines 1 and 2 are also provided with independent field or excitation windings 6 and 7, respectively, having only one common terminal of the same polarity.

I provide an electric translating system including a suitable phase transforming means, such as a Scott-connected or a T-connected transformer 8, which is connected to the alternating current circuit 5 and which effects an even distribution of load on circuit 5. Transformer 8 comprises primary windings 9 and independent secondary windings 10 and 11 having isolated neutral or intermediate connections 12 and 13, respectively. Unidirectional current is transmitted to field winding 6 from excitation winding 10 through suitable rectifying means such as a pair of electric valve means 14 and 15, and unidirectional current is transmitted to the field winding 7 from secondary winding 11 through electric valves 16 and 17. The electric valves 16 and 17 are preferably of the type employing an ionizable medium, such as a gas or a vapor, and each may comprise an anode 18, a cathode 19, and a control member or grid 20. If desired, the electric valves 16 to 17 may also be provided with a shield grid 21 which may be connected to the associated cathode 19. The electric valve circuit and associated transformer arrangement for energizing a plurality of direct current circuits from a polyphase alternating current circuit is disclosed and claimed in my copending divisional application Serial No. 310,209 filed December 20, 1939 and assigned to the assignee of the present application.

I provide a single control or regulating circuit 22 which controls the resultant voltage impressed on the control grids 20 of electric valves 14 to 17 in accordance with a predetermined electrical condition such as the armature voltage of machines 1 and 2, or in accordance with an electrical condition such as the voltage of the alternating current circuit 5. I provide a phase transforming means such as a transformer 23 which is arranged in a Scott-connection or a T-connection for impressing on the control grids 20 of electric valves 14 to 17 alternating voltages being displaced in phase in a lagging direction relative to the anode-cathode voltages by substantially 90 electrical degrees. Transformer 23 includes primary windings 24 and a pair of secondary windings 25 and 26. Secondary windings 25 and 26 are connected to afford an electrical, neutral connection 27.

As an agency for superimposing on the alternating grid voltages a unidirectional voltage which varies in accordance with an electrical condition of machines 1 and 2, such as the armature voltage of these machines, I provide a circuit 28. Certain features of the control circuit 28 are dislosed and claimed in my copending divisional application Serial No. 271,297 filed May 2, 1939, and assigned to the assignee of the present application. Circuit 28 may be of the bridge type having a pair of branches, one of which includes a suitable impedance element, such as a resistance 29, through which there is transmitted variable amounts of unidirectional current to control the resultant voltage appearing across its terminals and hence, to control the resultant voltage impressed on the control grids 20 of electric valves 14 to 17. An electric valve 30, which is preferably of the high vacuum type, transmits variable amounts of unidirectional current through resistance 29 and hence, controls the voltage appearing across the terminals of resistance 29. The electric valve 30 may include an anode 31, a cathode 32, a control grid 33, a screen grid 34, and a suppressor grid 35. The control grid 33 is connected to a point of suitable potential such as that provided by a voltage divider 36 having an adjustable contact or tap 37. A suitable current limiting resistance 38 may be connected in series relation with the control grid 33, if desired. The screen grid 34 is connected to a point of suitable potential, such as point 39 of a voltage divider comprising a pair of serially connected resistances 40 and 41 which constitute the other branch of the bridge. Resistances 40 and 41 are also connected in series relation with a suitable constant voltage device, such as an electric valve 42 of the glow discharge type. The resultant unidirectional voltage impressed on the control grids 20 is obtained from the lower terminal of resistance 29 and the common juncture 40a of resistances 40 and 41 through an output circuit 28' which is connected to neutral 27 and the cathodes 19 of electric valves 14—17.

Circuit 23 also includes a circuit 43 which produces a unidirectional voltage of the polarity indicated and the magnitude of which varies in accordance with the armature voltage of machines 1 and 2 or the voltage of circuit 5. Circuit 43 may be a bi-phase rectifier and may comprise a transformer 44 which is connected to circuit 5, a suitable rectifying device such as an electric valve 45, and a filter circuit comprising capacitances 46 and 47 and an inductance 48.

The operation of the embodiment of my invention may be explained by considering the system when the machines 1 and 2 are operating in parallel as synchronous alternating current generators transmitting energy to the alternating current supply circuit 5. Variable amounts of unidirectional current are transmitted to the field windings 6 and 7 of machines 1 and 2 through electric valves 14, 15, and 16, 17 from secondary windings 10 and 11 respectively. The resultant voltages impressed on the control grids 20 of electric valves 14 to 17 vary in phase with respect to the associated anode-cathode voltages to control the average current conducted by the electric valve means and hence, control the average current transmitted to the field windings 6 and 7.

Due to the fact that the transformer 23 is connected to produce a quadrature system of voltages, one of the components of voltage impressed on the control grids 20 lags the respective anode-cathode voltages by substantially 90 electrical degrees. A variable unidirectional component of voltage is supplied by resistance 29 of circuit 28. The conductivity of the electric valve 30 is varied in response to the voltage of circuit 5. The potential of the control grid 33 and the potential of the screen grid 34 both vary in response to the magnitude of the unidirectional voltage furnished by transformer 44, rectifier 45, and the filter circuit including capacitances 46 and 47 and inductance 48. By virtue of the fact that the potentials of both the control grid and the screen grid vary in accordance with the condition to be regulated, the amplification of the electric valve 30 will be large and hence, the sensitivity of the regulating system will be relatively great. If the voltage of the alternating current circuit 5 tends to rise above the predetermined value with respect to the standard voltage established by electric valve 42, the resultant unidirectional voltage drop appearing across the resistance 29 will decrease, effecting a retardation in phase of the resultant voltage impressed on the control grids 20 of the electric valves 14 to 17 thereby causing the electric valves to conduct a smaller amount of current and consequently, effecting a reduction in the voltage generated by machines 1 and 2. Conversely, if the voltage of circuit 5 decreases below the value to be maintained, the voltage appearing across the resultant unidirectional voltage will increase, effecting an increase in the field current transmitted to windings 6 and 7.

Referring more particularly to the operation of the circuit 28, the glow discharge valve 42 serves to maintain a predetermined constant voltage so that the cathode 32 of the electric valve 30 is maintained at a substantially constant potential relative to the negative terminal of the output circuit of rectifier 43. In addition, the glow discharge valve 42 also serves to effect an increased amplification by the electric valve 30 by placing the entire increment or decrement of the voltage of the output circuit of rectifier 43 on the control grid 34. As the output voltage of circuit 43 changes, the entire change in voltage is impressed on the grid 34 and this change in potential acting conjointly with the change in potential impressed on the control grid 43 effects a substantial change in the current transmitted through resistance 29 to effect more precise control of the electric valves 14—17.

Inasmuch as the field windings 6 and 7 of the means 1 and 2 are energized through a Scott-connected transformer the load imposed on the alternating current circuit 5 is evenly distributed. Of course, it will be understood that if these field windings were energized separately from single phase transformers connected to the circuit 5, the load imposed on the circuit 5 will be concentrated on two phases of that circuit whereas in the embodiment illustrated the load is evenly distributed. It is to be understood that while I have shown my invention as applied to an electric valve translating system for energizing two direct current circuits from a three-phase alternating current circuit, my invention may be applied to a system in which a plurality of direct current circuits are energized from an associated alternating current circuit having a number of phases greater than the number of direct current circuits.

An important feature of the embodiment of my invention described above is the facility with which a plurality of valves of intermediate current rating may be used to supply the field current for a number of machines. An additional important feature is the arrangement which permits the utilization of a single voltage controlling or regulating circuit for controlling the resultant voltages impressed on the control members of a plurality of electric valves which energize field windings of electrical machines operating in parallel.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a polyphase alternating current circuit, a plurality of alternating current machines connected thereto and being less than the number of phases of said alternating current circuit, each machine having a field winding, electric valve means for energizing each of said field windings, phase transforming means connected between said alternating current circuit and said electric valve means for providing a number of circuits corresponding to the number of said field windings, and means responsive to an operating condition of said plurality of machines for controlling said electric valve means.

2. In combination, a three-phase alternating current circuit, a pair of alternating current machines connected thereto and each having a field winding, electric valve means for energizing each of said field windings, a Scott-connected transformer connected between said alternating current circuit and said electric valve means, and means responsive to an operating condition of said pair of machines for controlling said electric valve means.

3. In combination, a polyphase alternating current circuit, a plurality of alternating current machines connected thereto and being less in number than the number of phases of said alternating current circuit, each of said machines having a field winding, electric valve means for energizing each of said field windings, phase transforming means connected between said alternating current circuit and said electric valve means for producing a number of voltages corresponding to the number of field windings, and voltage determining means connected to said alternating current circuit for controlling the conductivity of said electric valve means.

4. In combination, a three-phase alternating current circuit, a pair of electrically similar dynamo electric machines each having an armature winding connected to said circuit and each having a field winding, means for energizing the field windings comprising a Scott-connected transformer connected to said circuit and having a pair of secondary windings, electric valve means connected between each of said secondary windings and a different one of said field windings, said electric valve means being provided with control members, and a circuit for controlling said electric valve means comprising a Scott-connected transformer connected to said circuit for impressing on said control members a control voltage.

5. In combination, a three-phase alternating current circuit, a pair of electrically similar dynamo electric machines each having an armature winding connected to said circuit and having a field winding, means for energizing said field windings comprising a Scott-connected transformer connected to said circuit and having a pair of secondary windings, electric valve means connected between each of said secondary windings and a different one of said field windings, said electric valve means being provided with control members, means for impressing on said control members alternating voltages having a lagging phase displacement with respect to the applied anode-cathode voltages of said electric valve means and comprising a Scott-connected transformer connected to said alternating-current circuit, and means responsive to the voltage of said alternating current circuit and comprising a serially-connected impedance element and an electric valve means for superimposing on said alternating voltage a unidirectional component of voltage which varies in accordance with the voltage of said circuit.

6. In combination, a three-phase alternating current circuit, a pair of electrically similar dynamo electric machines each having an armature winding connected to said circuit and each having a field winding, means for energizing the field windings comprising a Scott-connected transformer connected to said circuit and having a pair of separate secondary windings each provided with an isolated intermediate connection, electric valve means connected between each of said secondary windings and a different one of said field windings through the associated intermediate connection, said electric valve means being provided with control members, means for impressing on said control members alternating voltages comprising a Scott-connected transformer connected to said alternating current circuit, and means for superimposing on said alternating voltages a unidirectional component of voltage which varies in accordance with the voltage of said alternating current circuit.

7. In combination, a three-phase alternating current circuit, a pair of electrically similar dynamo electric machines each having an armature winding connected to said circuit and each having a field winding, means for energizing the field windings comprising a Scott-connected transformer connected to said circuit and having a pair of separate secondary windings each being provided with an isolated intermediate connection, electric valve means connected between each of said secondary windings and a different one of said field windings through the associated intermediate connection, said electric valve means being provided with anode-cathode circuits and control members, means for impressing on said control members alternating voltages which lag the respective anode-cathode circuit voltages by substantially 90 electrical degrees and comprising a Scott-connected transformer energized from said alternating current circuit, and means for superimposing on said alternating voltages a unidirectional component of voltage which varies in accordance with the voltage of said alternating current circuit comprising a rectifier, a serially-connected impedance element and an electric valve means for transmitting variable amounts of unidirectional current from said rectifier through said impedance element and means for controlling the conductivity of said second mentioned electric valve means in accordance with the voltage of said rectifier.

ELMO E. MOYER.